United States Patent
Gerger et al.

[11] Patent Number: 5,148,658
[45] Date of Patent: Sep. 22, 1992

[54] CROP FEEDING APPARATUS

[76] Inventors: Jack F. Gerger, 1852 Coteau Ave., Weyburn, Saskatchewan, Canada, S4H 2X5; Lorne E. Fellner, Box 207, Ceylon, Saskatchewan, Canada, S0C 0T0

[21] Appl. No.: 739,683

[22] Filed: Jun. 4, 1991

[30] Foreign Application Priority Data

May 22, 1991 [CA] Canada .................................. 2043063

[51] Int. Cl.⁵ ..................... A01D 34/04; A01D 34/13; A01D 57/00; A01D 65/02
[52] U.S. Cl. ........................................ 56/14.5; 56/123; 56/158; 56/298; 56/DIG. 17
[58] Field of Search ...................... 56/14.5, 14.3, 14.6, 56/123, 124, 125, 158, 185, 258, 298, 305, 312, 300, DIG. 17

[56] References Cited

U.S. PATENT DOCUMENTS

| | | | |
|---|---|---|---|
| 722,326 | 3/1903 | Rapson | 56/312 |
| 1,806,928 | 5/1931 | Bartels | 56/14.5 X |
| 2,832,187 | 4/1958 | Johnson | 56/14.5 X |
| 3,199,279 | 8/1965 | Yeske | 56/305 |
| 3,412,535 | 11/1968 | Drummond | 56/14.5 X |
| 4,022,000 | 5/1977 | Coxbill | 56/312 |
| 4,617,787 | 10/1986 | Eguchi et al. | 56/14.6 |

FOREIGN PATENT DOCUMENTS 751113 1/1967 Canada .

Primary Examiner—Stephen J. Novosad

[57] ABSTRACT

A harvesting attachment for a combine that includes a table or platform carrying an auger to convey a cut crop into the combine body for threshing. The leading edge of the table carries a reciprocating knife to cut the crop. There is a considerable gap between the cutting knife and auger which is bridged by special rod-like teeth which are mounted on the knife and reciprocate therewith. Such teeth assist in conveying the cut crop to the auger especially when the crop is short, thin and has a strong tendency to bunch.

16 Claims, 2 Drawing Sheets

CROP FEEDING APPARATUS

This application relates to combine harvester feeding and more particularly to conveying means located between the combine cutter bar and table auger.

BACKGROUND OF THE INVENTION

Poor growing conditions generally yield a crop that is short, thin, and light. Such a crop brings with it a common problem especially when straight combining crops such as wheat and in particular Durum wheat. The problem is that the cut crop builds up on the header table just rearward of the knife causing bunching and poor feeding into the combine. Such poor and uneven feeding causes many problems such as, loss of crop material on the header table, grain loss over the combine sieves due to bunching, excessive wear and tear on the combine due to bunching, and the necessary reduction in travel speed due to material build up on the header table.

In an effort to obviate the above problems several different approaches have been taken as exhibited in U.S. Pat. Nos. 4,617,787, 2,909,022 and Canadian Patent 751,113. In U.S. Pat. No. 4,617,787, there is disclosed a front conveyor means between the cutting means and a conventional table mounted auger which carries the cut grain to a central feeder and into the combine body to be threshed. The front conveyor means is between side plates of the machine body. The conveyors include belt means moved by a rotary drive. Applicants apparatus has none of the above elements but functions in a similar manner. There is disclosed in U.S. Pat. No. 2,909,022 a pneumatic assisted means of conveying. The conventional mechanical reels are adapted to conduct a flow of air for blowing of the cut grain stalks in the direction of the auger. Applicants apparatus is completely mechanical, is extremely simple and inexpensive but is equal in ability to carry out the desired function. In the Canadian Patent "113", we again have an air assist means for conveying short, light crops to the table auger. This is done by means of air being conducted to outlets in the knife guards. As pointed out heretofore applicants apparatus requires no moving belts or air assists since it is a series of specially designed teeth mounted on the reciprocating cutter knife at a specific location and directed at a desired angle. The teeth are low in cost compared to the air assist types, or the belt conveyor types, they are light in weight, they can remain installed under all conditions and they perform extremely well.

SUMMARY OF THE INVENTION

In a combine harvester for cutting and threshing cereal grains or the like we have a platform or table carrying an auger to convey the cut grain into the combine body. A reciprocating knife is carried at the leading edge of the table to cut the grain, however, there is a considerable gap between the knife and the auger. To bridge this gap applicant has provided crop feeding teeth which are secured to the reciprocating knife and reciprocate therewith. The teeth have a longitudinal rod-like body. At one end of the body is a means to mount the tooth on the reciprocating knife at various angles and at the other end there is a curve in the tooth in the plane of the mounting means to direct the flow of grain. Along the body of the tooth are located a plurality of protrusions that permit one way movement of the cut grain over the tooth again assisting in the flow of the cut grain thereby avoiding any unwanted bunching.

In view of the foregoing it is a prime object of the instant invention to provide an effective conveying apparatus between the cutter knife and the table auger.

A further object of applicants invention is the provision of an easily installed, easily manufactured conveying apparatus.

A further object of this invention is the provision of a low cost maintenance free conveying apparatus.

Other objects and a fuller understanding of the invention may be had by referring to the following disclosure and claims, taken in conjunction with the accompanying drawings.

DETAILED DESCRIPTION OF PREFERRED EMBODIMENT

Figure 1:
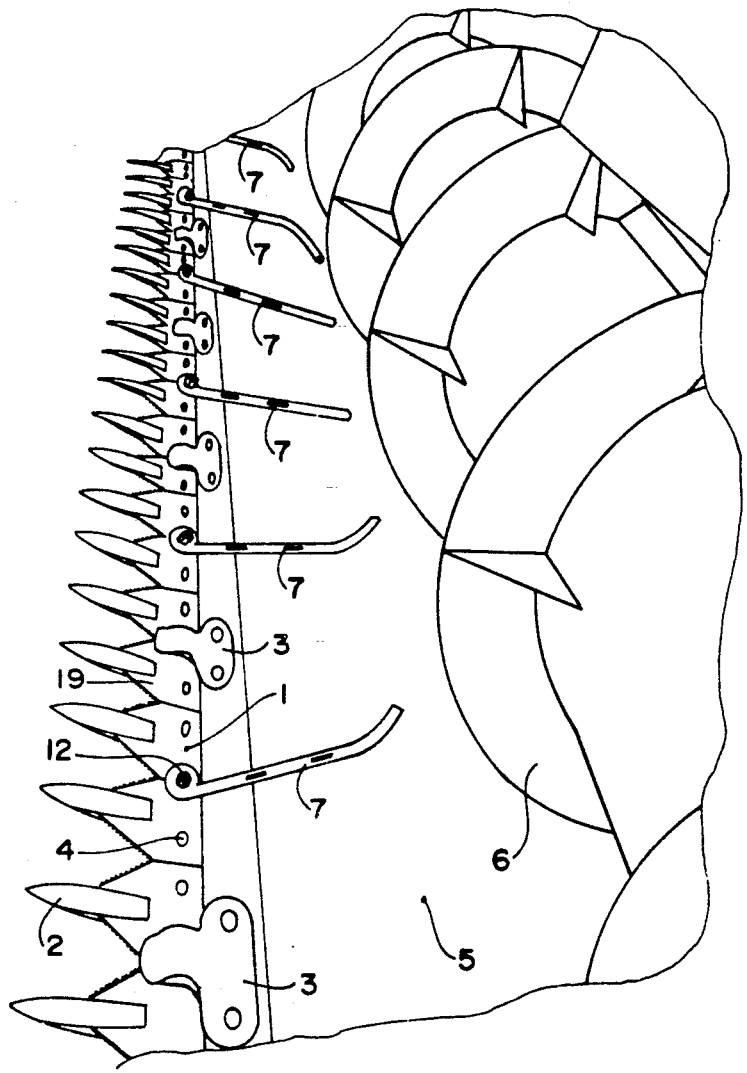
FIG. 1 is a perspective view of a combine feeder table with crop feeder teeth between the table leading edge and the grain auger.

Referring now to FIG. 1 we have a harvester table 5 with rear wall and ends (not shown) which rotatably support an auger 6 which feeds rearwardly a cut crop to the threshing body (not shown). A crop cutting knife 1 is reciprocally mounted on the leading edge of table 5 and held in place by several knife clips 3. The knife 1 is comprised of several serrated blades 19 commonly called sickle blades or sections. The knife blades 19 are riveted by rivets 4 to a knife bar 20 which is driven in a reciprocating manner as mentioned above. Forwardly of the reciprocating knife 1 are several knife guards 2 which protect the knife blades 19 and guide the uncut crop towards these knife blades 19. Mounted on the knife 1 are crop feeder teeth 7 several embodiments of which are shown in detail in FIGS. 2, 3 and 4. Since the feeder teeth 7 are mounted on the reciprocating knife 1 they also reciprocate thereby assisting in the feeding of the cut crop to the auger 6. When no feeder teeth are provided, a light, thin, short crop has a severe tendency to bunch up on the table 5. The teeth are mounted by removing a rivet 4 and replacing it by a mounting bolt 12 which will be discussed in more detail regarding FIG. 6.

Figure 2:
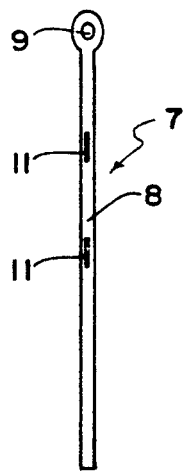
FIG. 2 is a first tooth embodiment.
Figure 3:
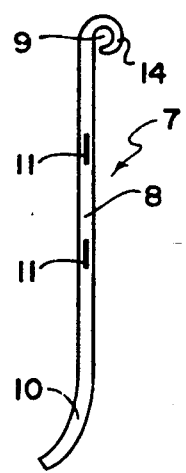
FIG. 3 is a second tooth embodiment
Figure 4:
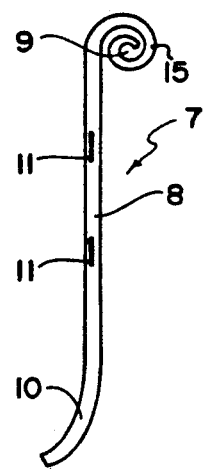
FIG. 4 is a third tooth embodiment.

Looking at the different types of teeth 7 we have in FIGS. 2, 3 and 4 three types which may be used. In FIG. 2 we have a basically straight tooth body 8 having projections 11 perpendicular to a plane containing a tooth mounting aperture 9. These teeth may be formed from various materials such as metal or plastic. In FIG. 3 we have a similar tooth with a body 8 and rearwardly outwardly inclined projections 11. The mounting aperture 9 has been formed by a single bend at one end and at the other end a curve 10 is formed. The projections 11 and the curve 10 assist in conveying the cut crop towards the center of the auger and prevent undesirable bunching. The teeth are mounted above the knife blade 19 by approximately a mounting nut thickness as will be discussed in more detail regarding FIG. 6. FIG. 4 teeth have the same features as FIG. 5 except that the aperture 9 is formed by spiral 15 to give more resilience to the tooth at its mounting.

Figure 5:
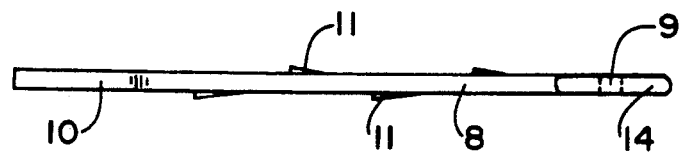
FIG. 5 is a side elevation of FIG. 3.

In regard to FIG. 5 we more clearly show the location and form of the projections 11 and how the bend 10 is in the plane of the formed aperture 9. The projections 11 are on the upper side and the lower side since it may be desirable or necessary to use the tooth turned over.

Figure 6:
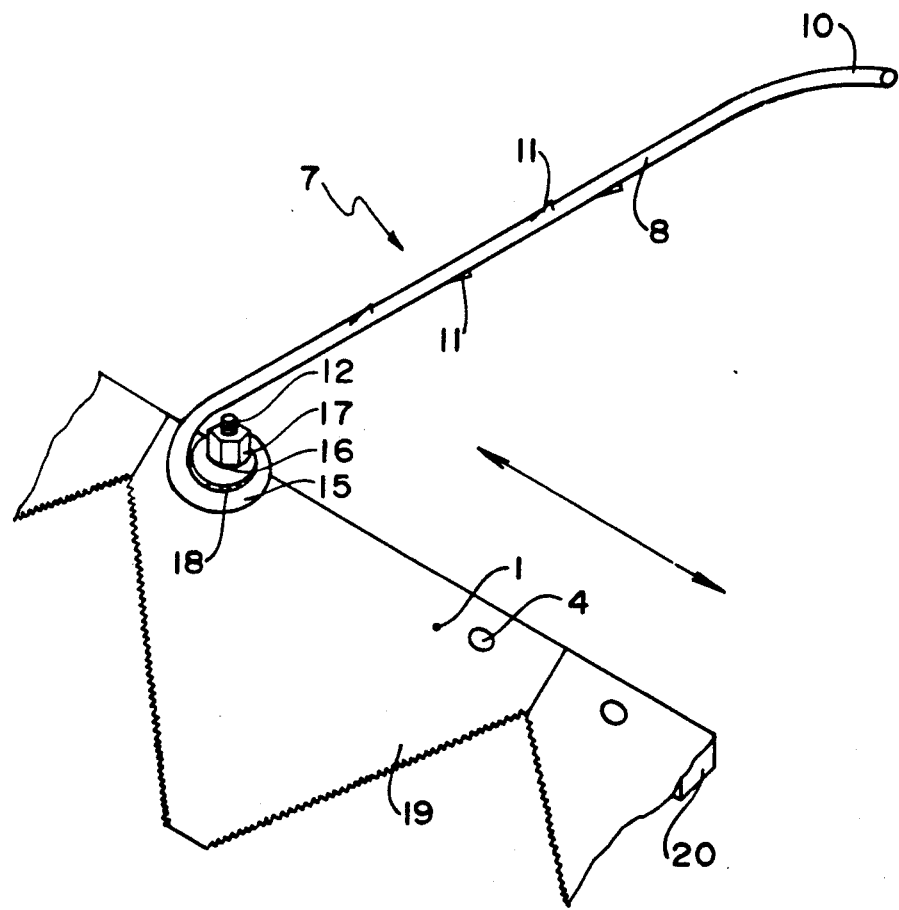
FIG. 6 is a partial perspective view of the combination knife and feeder tooth.

Referring now to FIG. 6 we have shown only a portion of the knife 1 having its blades 19 mounted on the bar 20. The knife blades 19 are normally mounted by two rivets 4. In this case one rivet 4 has been removed and replaced by a mounting bolt 12. A first lower nut 18 assists in holding the blade 19 to the bar 20, the tooth 7 is then placed on top of the nut 18 with the aperture 9 allowing passage of the bolt 12, the top nut 17 is then placed on bolt 12 securing tooth 7 in place at a desirable angle with the combine body axis and spaced from the knife blade 19 by the thickness of the lower nut 18. Washers 16 may be placed between each nut 17 and 18 and the tooth 7 if deemed necessary.

It is readily discernible that applicants device has not heretofore been known, and compared to other devices carrying out the same function is simple, inexpensive yet has proven extremely effective.

Although applicants have described the invention with a certain degree of particularity, it is understood that the present disclosure has been made only by way of example and that numerous changes in the details of construction and the combination and arrangement of part may be resorted to without departing from the spirit and scope of the invention as hereinafter claimed.

What we claim is:

1. In a combine harvester, a threshing body with a harvesting assembly mounted thereon, said harvesting assembly including a cutting assembly and a transfer assembly, said cutting assembly for cutting a standing crop comprising a header table having end walls a rear wall and thresher body mounting means, a knife having a plurality of cutting blades fastened to a reciprocating bar mounted on the leading edge of said header table, guards mounted on the leading edge of said header table and protruding forwardly of the knife to prevent damage thereto, knife clips also mounted on the leading edge of said header table and extending over the cutting blades to keep said knife in place, said transfer assembly for conveying the cut crop from said knife to said threshing body comprising auger means rotatably mounted in said end walls for feeding the cut grain through an opening in said rear wall to the threshing body, crop feeder teeth mounted on said knife to reciprocate therewith and extending between the knife and said auger means thereby avoiding bunching of the cut crop on the header table before it reaches said auger means.

2. A harvesting assembly as claimed in claim 1 wherein at least one of said cutting blades is fastened to the reciprocating bar by screw threaded fastening means and rivet fastening means.

3. A harvesting assembly as claimed in claim 2 wherein said crop feeder teeth are mounted on said knife by said screw threaded fastening means.

4. A harvesting assembly as claimed in claim 3 wherein said crop feeder teeth are rod-like members which extend rearwardly from said knife at various angles to a central longitudinal axis of the threshing body.

5. A harvesting assembly as claimed in claim 4 wherein the crop feeder teeth are mounted 6-12 ins. (15-30 mm) apart.

6. A crop feeder kit for use with a combine harvester to convey cut crop material from a crop cutting assembly to an auger means comprising: crop feeding teeth, mounting bolts to pass through a knife bar, cutting blade and crop feeding tooth, two self locking nuts for each tooth, a first one to assist in securing the cutting blade and a second one to fasten the feeder tooth against the first self locking nut, said crop feeding teeth comprising, a central elongated body portion, a mounting portion on a first end of said body portion and a curved portion on a second end of said body portion, a mounting eye formed as a part of said mounting portions, said curved portion and said mounting portion being in a single plane to assist in a more positive even feeding of the cut crop.

7. A crop feeder kit as claimed in claim 6 wherein the mounting eye is formed by spirally forming said mounting portion.

8. A crop feeder kit as claimed in claim 6 wherein the mounting portion of said crop feeding teeth is in the form of a flat spiral, the center of said spiral forming said mounting eye.

9. A crop feeder kit as claimed in claim 8 further including one way projections along said central elongate body portion of the teeth perpendicular to said single plane.

10. In a harvesting assembly of a combine harvester having a header table with a leading edge and a crop auger rotatably mounted on said header table, a knife having a plurality of cutting blades fastened to a reciprocating bar slidably mounted on the leading edge of said header table, a crop feeder tooth mounted on at least one of said cutting blades and extending rearwardly toward said crop auger to reciprocate with the cutting blades, whereby crop material cut by said knife is conveyed to said auger in a uniform flow free of bunching.

11. In a harvester assembly as defined in claim 10 wherein the crop feeder tooth has a rod-like body with a curved distal end and a mounting eye formed in its proximal end and formed mounting eye are all in the same plane.

12. In a harvester assembly as defined in claim 11 wherein said mounting eye is formed in a spiral configuration.

13. In a harvester assembly as defined in claim 11 wherein the crop feeder tooth has at least one outwardly and rearwardly inclined protrusion mounted on said rod-like body.

14. In a harvester assembly as defined in claim 12 wherein the crop feeder tooth has outwardly and rearwardly inclined protrusions mounted on said rod-like body.

15. In a harvester assembly as defined in claim 13 wherein said inclined protrusions are at a right angle to said plane.

16. In a harvester assembly as defined in claim 14 wherein said inclined protrusions are at a right angle to said plane.

* * * * *